US012708989B2

(12) United States Patent
Huang

(10) Patent No.: US 12,708,989 B2
(45) Date of Patent: Aug. 18, 2026

(54) PNEUMATIC IMPACT DISASSEMBLY TOOL

(71) Applicant: Bo-Wei Huang, Taichung City (TW)

(72) Inventor: Bo-Wei Huang, Taichung City (TW)

( * ) Notice: Subject to any disclaimer, the term of this patent is extended or adjusted under 35 U.S.C. 154(b) by 275 days.

(21) Appl. No.: 18/734,640

(22) Filed: Jun. 5, 2024

(65) Prior Publication Data

US 2025/0375863 A1 Dec. 11, 2025

(51) Int. Cl.

*B25B 27/00* (2006.01)
*B25B 27/02* (2006.01)
*F02M 61/16* (2006.01)

(52) U.S. Cl.

CPC ........ *B25B 27/026* (2013.01); *B25B 27/0035* (2013.01); *F02M 61/168* (2013.01)

(58) Field of Classification Search

CPC ........ B25B 27/026; B25B 27/00; B25B 27/02
See application file for complete search history.

(56) References Cited

U.S. PATENT DOCUMENTS 1,650,964 A * 11/1927 Schmitt ................. B25B 27/023 29/262
D272,712 S * 2/1984 Allen ............................... D8/89
6,886,227 B1 * 5/2005 Hedrick ................ B25B 27/023 29/263
12,372,119 B2 * 7/2025 Andrews ................. F16C 43/02
2024/0217079 A1 * 7/2024 Liaw ..................... B25B 27/026
2024/0376936 A1 * 11/2024 Andrews ................. F16C 43/02
2025/0033173 A1 * 1/2025 Lai ........................... B25D 9/08
2025/0375863 A1 * 12/2025 Huang .................. B25B 27/026

FOREIGN PATENT DOCUMENTS

TW M455067 U 6/2013

* cited by examiner

*Primary Examiner* — Lee D Wilson
(74) *Attorney, Agent, or Firm* — MUNCY, GEISSLER, OLDS & LOWE, P.C.

(57) ABSTRACT

A pneumatic impact disassembly tool includes an impact cylinder, a separator disposed in the impact cylinder to divide it into a first and a second chamber, an air conduit, an air inlet switch, and a connection rod. The separator has an air chamber in communication with the first and the second chambers through a first and a second air ducts. The air conduit passes through the impact cylinder to be connected with the separator and communicates with the air chamber. The air inlet switch is coaxially connected with the air conduit and controls the gas entry into the impact cylinder. The connection rod passes through the impact cylinder to be coaxially connected with the air conduit. When the air conduit inputs a gas, the impact cylinder generates a sliding shock back and forth between the air conduit and the connection rod for pneumatic impact disassembly.

9 Claims, 6 Drawing Sheets

PNEUMATIC IMPACT DISASSEMBLY TOOL

BACKGROUND OF THE INVENTION

1. Field of the Invention

The present invention relates to disassembly tools, and more particularly, to a pneumatic impact disassembly tool.

2. Description of the Related Art

Referring to Taiwan patent M455067, an improved structure of a nozzle disassembly tool for fuel injectors, wherein the disassembly tool comprises a pulling member and a mounting member. The mounting member is connected to the fuel injector, and the mounting member is assembled with the pulling member. The pulling member comprises a connecting rod, and a grip barrel mounted around the outer side of the connecting rod. When the user pulls the grip barrel upward, the inner wall of the grip barrel contacts the expanding portion of the connecting rod, thereby driving the mounting member to disassemble the fuel injector.

However, the use of the disassembly tool above requires the user to manually pull the grip barrel upward to achieve the purpose of disassembling the fuel injector, which is relatively time and labor-consuming in practical operation.

SUMMARY OF THE INVENTION

To improve the issues above, the present invention discloses a pneumatic impact disassembly tool, which pneumatically generates a shock force, achieving a shock disassembly of the to-be-disassembled object, thereby improving the operation efficiency.

For achieving the aforementioned objectives, the present invention provides a pneumatic impact disassembly tool, comprising an impact cylinder, a separator, an air conduit, an air inlet switch, and a connection rod. The impact cylinder comprises a first end, a second end, and an inner space formed between the first end and the second end. The separator is disposed in the inner space, and the separator divides the inner space into a first and a second chamber. The separator comprises an air chamber therein in communication with the first chamber and the second chamber through a first air duct and a second air duct, respectively. The air conduit has one end thereof passing through the second end to be connected with the separator, so as to be in communication with the air chamber. The air inlet switch is coaxially connected with another end of the air conduit, and comprises a switch and an intake part. The switch optionally connects the intake part and the air conduit. The connection rod comprises a first combining end and a second combining end, wherein the second combining end passes through the first end to be coaxially connected with the air conduit. When the air conduit inputs a gas, the impact cylinder generates a sliding shock back and forth between the air conduit and the connection rod.

With such configuration, the present invention pneumatically generates the shock force, which, compared to the conventionally manual operation, facilitates a more efficient and effective object disassembly operation.

Also, due to the coaxial arrangement of the air conduit, the air inlet switch, and the connection rod, the present invention is generally formed in an elongate shape, so as to easily enter a long and narrow space, improving the application range of the

DETAILED DESCRIPTION OF THE INVENTION

Figure 1:
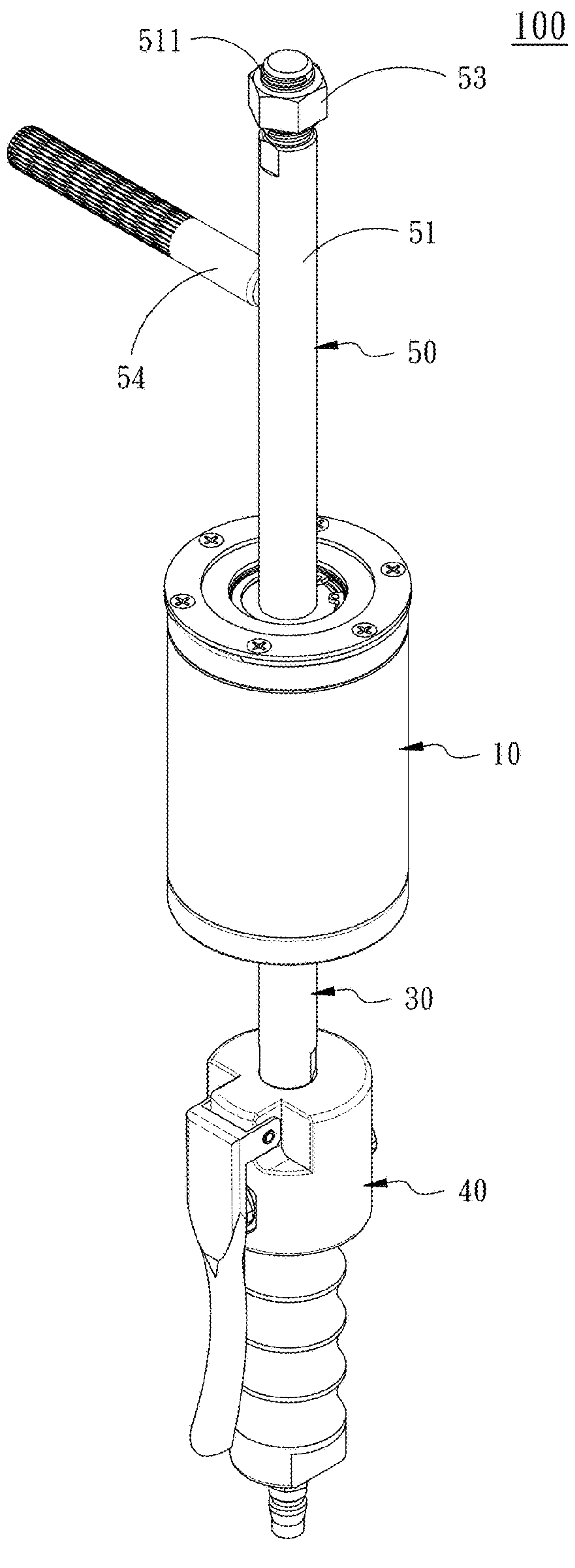
FIG. 1 is a perspective view of a pneumatic impact disassembly tool in accordance with an embodiment of the present invention.

The aforementioned and further advantages and features of the present invention will be understood by reference to the description of the preferred embodiment in conjunction with the accompanying drawings where the components are illustrated based on a proportion for explanation but not subject to the actual component proportion. Embodiments of the present invention are illustrated in detail along with the drawings. However, the technical features included by the present invention are not limited to certain embodiments hereby provided. Scope of the present invention shall be referred to the claims, which include all the possible replacements, modifications, and equivalent features.

Referring to FIG. 1 to FIG. 6, the present invention discloses a pneumatic impact disassembly tool 100, comprising an impact cylinder 10, a separator 20, an air conduit 30, an air inlet switch 40, and a connection rod 50.

The impact cylinder 10 comprises a first end 11, a second end 12, and an inner space 13 formed between the first end 11 and the second end 12, wherein the first end 11 and the second end 12 are fastened to the cylinder body of the impact cylinder 10.

Figure 3:
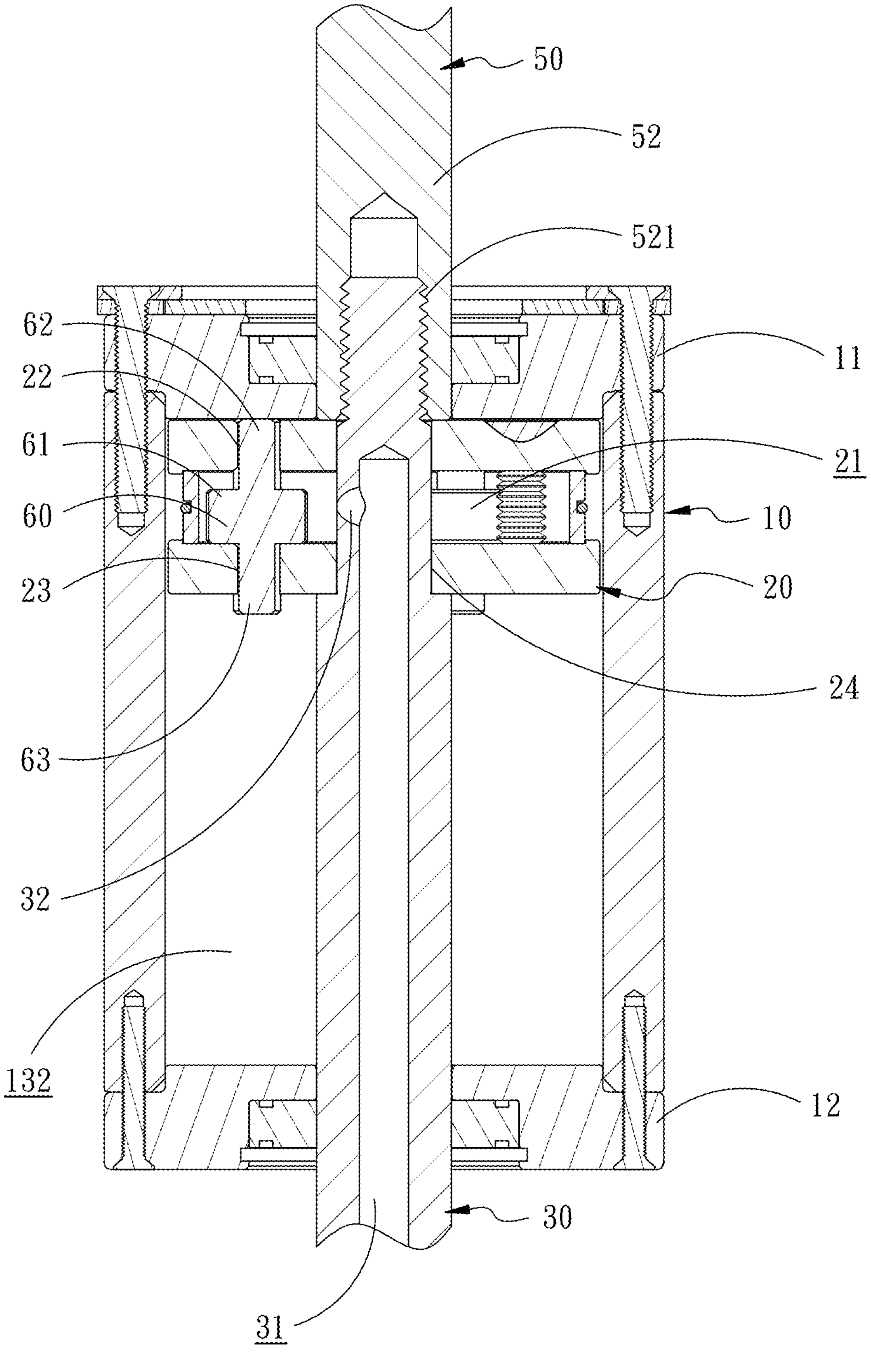
FIG. 3 is a sectional view of the impact cylinder of the pneumatic impact disassembly tool, illustrating the first chamber before gas entry.
Figure 4:
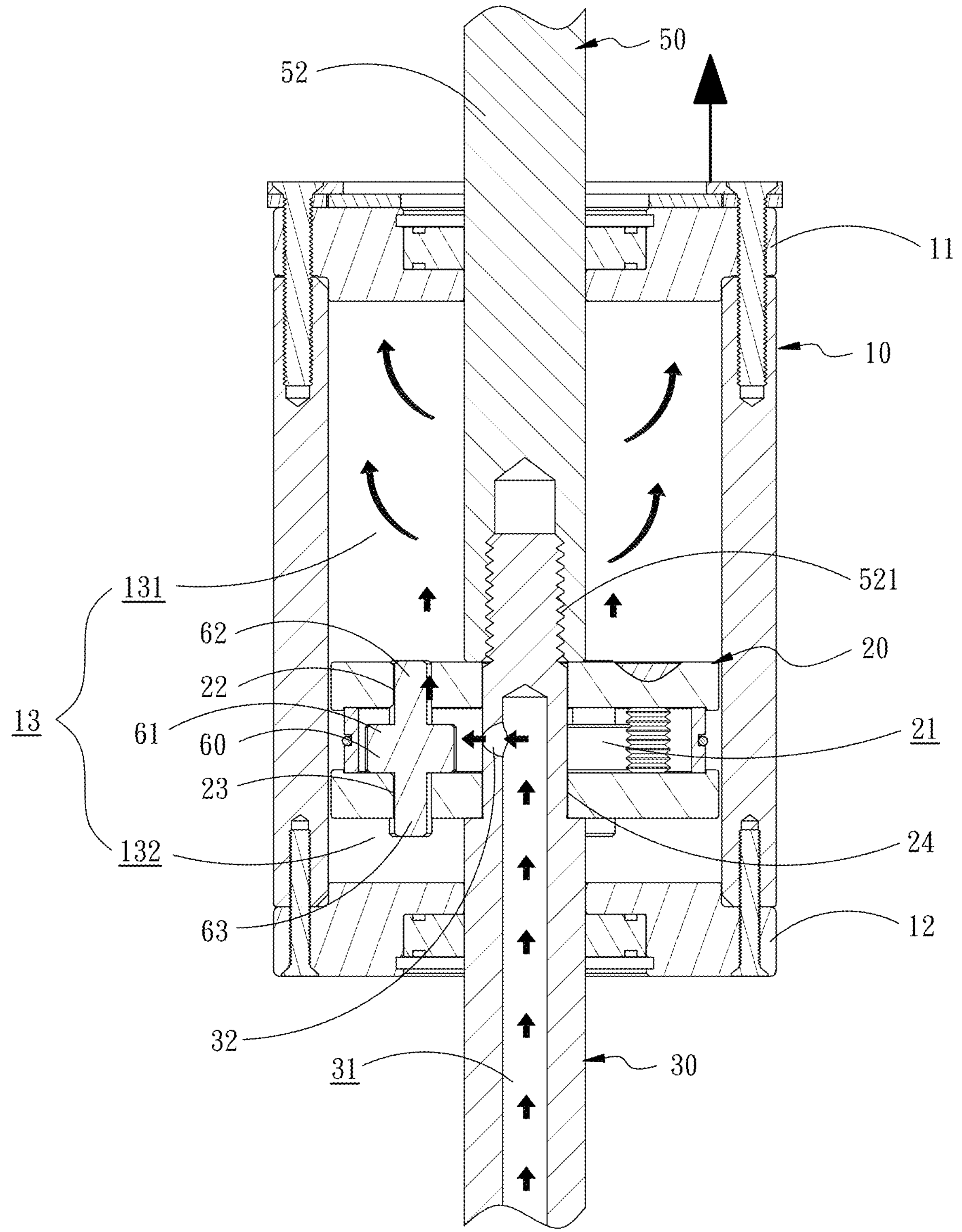
FIG. 4 is an operation schematic view of the pneumatic impact disassembly tool, illustrating the gas entering the first chamber from the first air duct, whereby the impact cylinder moves upward.

Referring to FIG. 3, the separator 20 is disposed in the inner space 13, so as to divide the inner space 13 into a first chamber 131 and a second chamber 132. The separator 20 comprises an air chamber 21 therein. The air chamber 21 is in communication with the first chamber 131 through a first air duct 22 and in communication with the second chamber 132 through a second air duct 23. The separator 20 comprises a through hole 24 passing two sides thereof, so as to be in communication with the air chamber 21. The through hole 24 is arranged in parallel to the first air duct 22 and the second air duct 23. In the embodiment, a plurality of first air ducts 22 and second air ducts 23 are included; the number of the first air duct 22 is equal to the number of the second air duct 23, and the first air duct 22 and the second air duct 23 are disposed in a coaxial arrangement.

As shown by FIG. 3, in the embodiment, a direction switching member 60 is further included, wherein the number of the direction switching member 60 corresponds to that of the first air duct 22 and the second air duct 23. The direction switching member 60 is movably disposed in the air chamber 21 and configured to selectively cover the first air duct 22 or the second air duct 23. The direction switching member 60 comprises a body part 61, with a positioning protrusion 62, 63 disposed on two ends of the body part 61, respectively. The positioning protrusions 62, 63 have an outer diameter smaller than an outer diameter of the body part 61, and configured to be movably positioned in the first air duct 22 and the second air duct 23. Therein, when the direction switching member 60 moves toward the first air duct 22 for the body part 61 to cover the first air duct 22, the gas flows through the air chamber 21, the second air duct 23, and the second chamber 132. When the direction switching member 60 moves toward the second air duct 23 for the body part 61 to cover the second air duct 23, the gas flows through the air chamber 21, the first air duct 22, and the first chamber 131.

The air conduit 30 has one end thereof passing through the second end 12 of the impact cylinder 10 to be connected with the separator 20, such that the air conduit 30 is in communication with the air chamber 21. The air conduit 30 comprises an intake duct 31 arranged along an axial direction and a vent 32 arranged in perpendicular communication with the intake duct 31 In the embodiment, an end part of the air conduit 30 provided with the vent 32 is inserted into the through hole 24 of the separator 20, so that the vent 32 is in communication with the air chamber 21.

Figure 2:
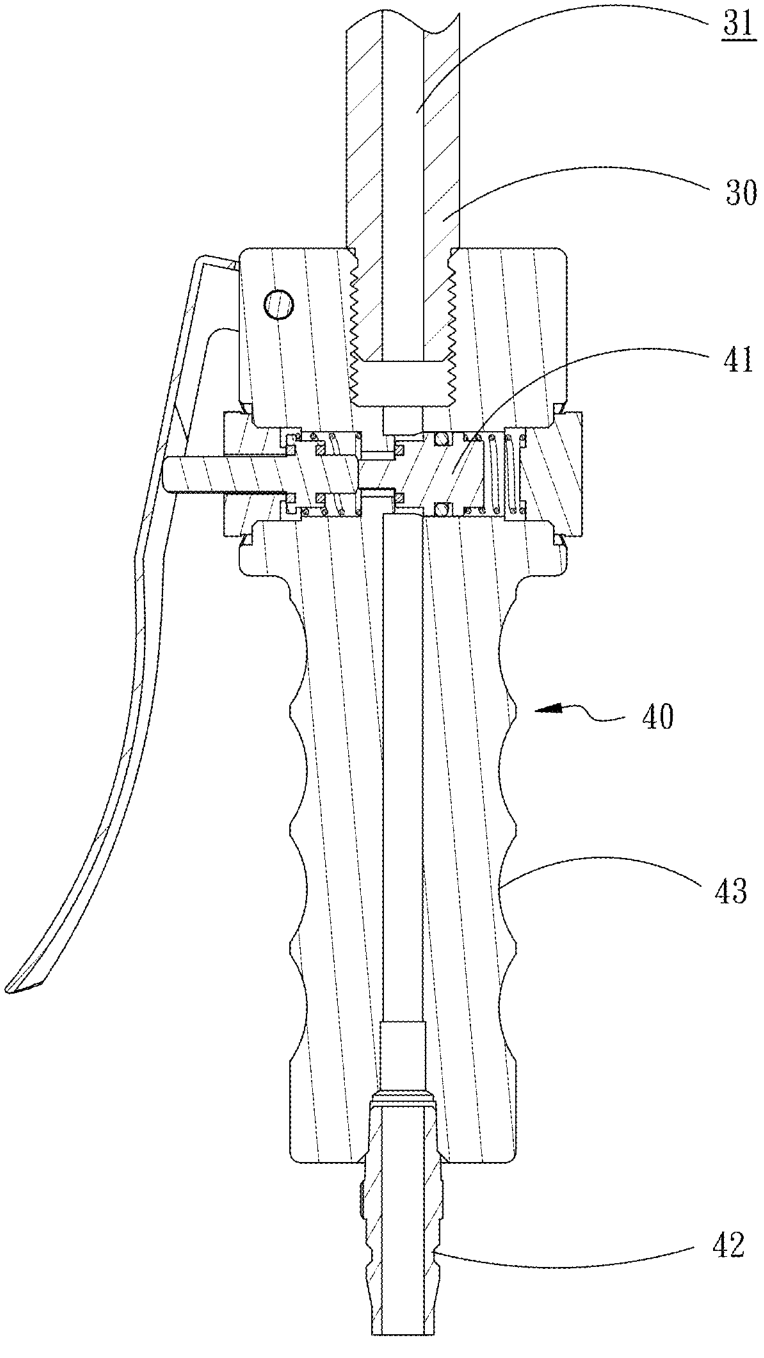
FIG. 2 is a sectional view of the air inlet switch of the pneumatic impact disassembly tool in accordance with an embodiment of the present invention.

As shown by FIG. 2 and FIG. 3, the air inlet switch 40 is coaxially connected with another end of the air conduit 30. The air inlet switch 40 comprises a switch 41 and an intake part 42, with a handgrip 43 disposed between the switch 41 and the intake part 42 for the user to hold. The switch 41 is a trigger mechanism, which optionally connects the intake part 42 and the air conduit 30. The intake part 42 is pneumatically connected with an air pressure source. When the switch 41 is pressed during operation, a gas is inputted from the intake part 42 and the air conduit 30 into the impact cylinder 10, thereby driving the impact cylinder 10 to move.

Referring to FIG. 1 and FIG. 2, the connection rod 50 comprises a first combining end 51 and a second combining end 52. The first combining end 51 comprises a thread 511 which is screwed to a fixing nut 53. The second combining end 52 passes through the first end 11 of the impact cylinder 10 to be coaxially connected with the air conduit 30 through a, for example but not limited to, screwing method. In the embodiment, the second combining end 52 comprises a connection bore 521, into which a part of the air conduit 30 exposed from the separator 20 is inserted for combination. Therefore, when the air conduit 30 inputs the gas, the impact cylinder 10 generates a sliding shock back and forth between the air conduit 30 and the connection rod 50.

In addition, the connection rod 50 comprises an assistance rod 54 disposed in a perpendicular arrangement thereon for the user to hold during the operation.

Referring to FIG. 1 to FIG. 4, during the operation of the present invention, according to the form of the to-be-disassembled object, the to-be-disassembled object is allowed to be directly connected to the thread 511 of the connection rod 50 or fastened to the connection rod 50 by use of the fixing nut 53. Also, a tool member is allowed to be combined with the thread 511 or the fixing nut 53 for connecting the to-be-disassembled object. Once the intake part 42 is pneumatically in communication with the air pressure source, the user presses to operate the switch 41, so that the gas enters the air chamber 21 through the intake part 42, the intake duct 31, and the vent 32, so as to be inputted into the first chamber 131 through the first air duct 22 (the body part 61 of the direction switching member 60 covering the second air duct 23). Therefore, the impact cylinder 10 is pushed to move toward the direction indicated by the arrows in FIG. 4.

Figure 5:
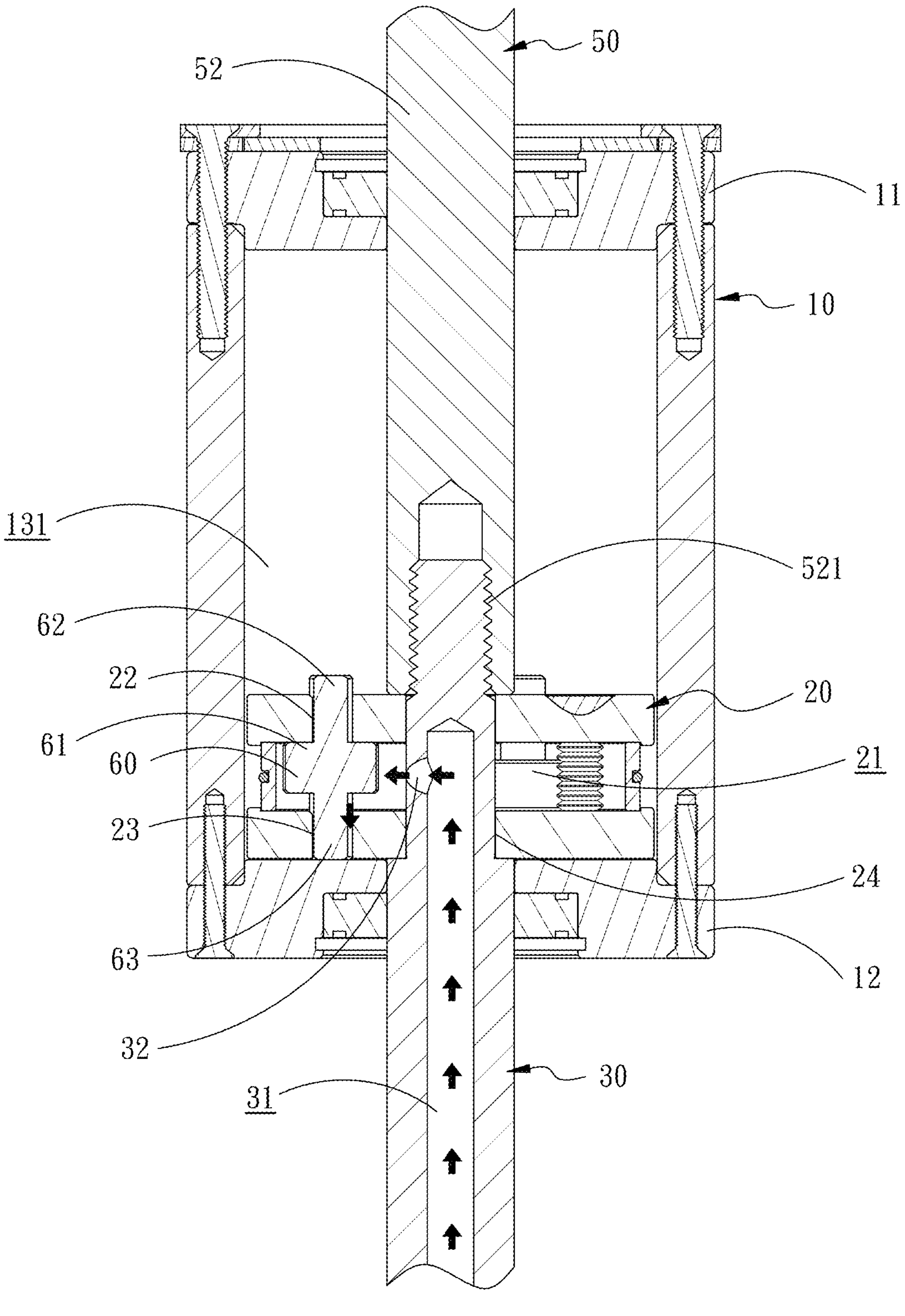
FIG. 5 is an operation schematic view of the pneumatic impact disassembly tool, illustrating the direction switching member contacting the second end of the impact cylinder.
Figure 6:
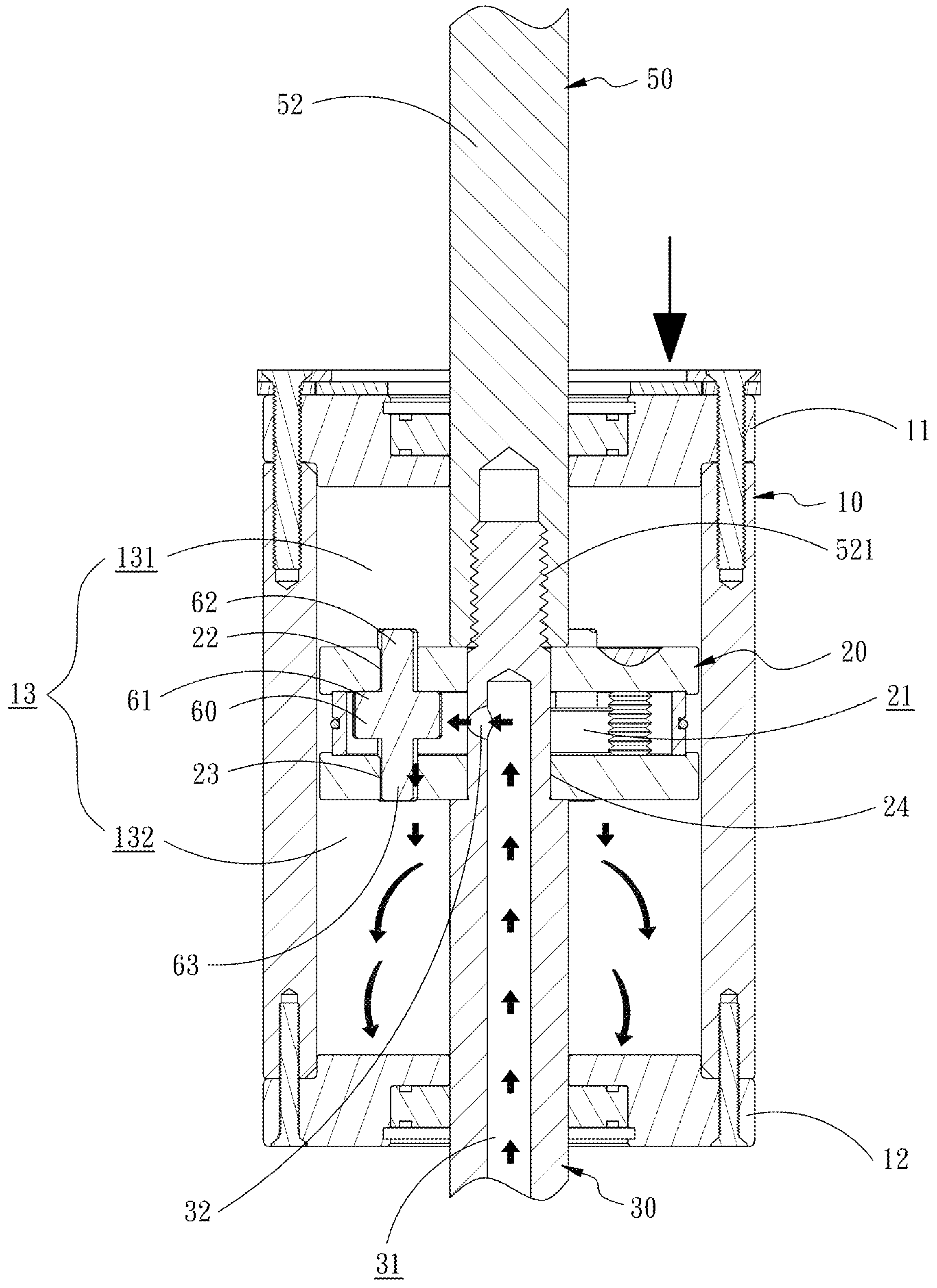
FIG. 6 is an operation schematic view of the pneumatic impact disassembly tool, illustrating the gas entering the second chamber from the second air duct, whereby the impact cylinder moves downward.

Referring to FIG. 5, when the positioning protrusion 63 on the lower side of the direction switching member 60 contacts the second end 12 of the impact cylinder 10, the direction switching member 60 displaces with respect to the separator 20 until the body part 61 of the direction switching member 60 covers the first air duct 22, so that the gas is inputted through the second air duct 23 into the second chamber 132, whereby the impact cylinder 10 moves toward the direction indicated by the arrows in FIG. 6.

Therefore, according to the motion schematically shown in FIG. 3 to FIG. 6 of the present invention, the impact cylinder 10 is allowed to slide back and forth between the air conduit 30 and the connection rod 50. During the repeatedly sliding back and forth, the connection rod 50 is imposed with a shock impact force, which is transmitted through the connection rod 50 to the to-be-disassembled object (such as a fuel injector or other vehicle components). By use of the present invention, the to-be-disassembled object is removed from the installation location, so that the user is allowed to easily complete the disassembly operation.

With the foregoing configuration, the pneumatic impact disassembly tool 100 of the present invention achieves following advantages.

The present invention improves the operation efficiency. By pneumatically generating the shock force, compared with the conventionally manual operation, the present invention effectively and efficiently achieves the disassembly operation of the object.

The present invention is applicable to relatively narrow space. Due to the coaxial arrangement of the air conduit 30, the air inlet switch 40, and the connection rod 50, the present invention is generally formed in an elongate shape, so as to easily enter a long and narrow space, improving the application range of the present invention.

The present invention saves manpower requirement. Manual operation is no longer needed. Instead, the present invention applies the pneumatic impact principle, lowering the user's operational burden and enhancing ease of use.

The present invention achieves a precise control. The air inlet switch 40 allows users to optionally control the gas intake, facilitating a higher operation flexibility and precision.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A pneumatic impact disassembly tool, comprising:

an impact cylinder having a first end, a second end, and an inner space formed between the first end and the second end;

a separator disposed in the inner space and dividing the inner space into a first chamber and a second chamber, the separator comprising an air chamber in communication with the first chamber through a first air duct and in communication with the second chamber through a second air duct;

an air conduit having one end thereof passing through the second end to be connected with the separator, such that the air conduit is in communication with the air chamber;

an air inlet switch coaxially connected with another end of the air conduit, the air inlet switch comprising a switch and an intake part, the switch optionally connecting the intake part and the air conduit; and a connection rod having a first combining end and a second combining end, the second combining end passing through the first end to be coaxially connected with the air conduit; when the air conduit inputs a gas, the impact cylinder generates a sliding shock back and forth between the air conduit and the connection rod.

2. The pneumatic impact disassembly tool of claim 1, wherein the separator comprises a through hole in communication with the air chamber; the through hole is arranged in parallel to the first air duct and the second air duct.

3. The pneumatic impact disassembly tool of claim 2, wherein the air conduit comprises an intake duct arranged along an axial direction and a vent arranged in perpendicular communication with the intake duct; the vent is in communication with the air chamber.

4. The pneumatic impact disassembly tool of claim 3, wherein the second combining end comprises a connection bore; the air conduit is inserted into the connection bore.

5. The pneumatic impact disassembly tool of claim 4, further comprising a direction switching member movably disposed in the air chamber for selectively covering the first air duct or the second air duct.

6. The pneumatic impact disassembly tool of claim 5, wherein the direction switching member comprises a body part and a positioning protrusion disposed on two ends of the body part, respectively; the two positioning protrusions are movably positioned in the first air duct and the second air duct, respectively.

7. The pneumatic impact disassembly tool of claim 6, wherein the second combining end is screwed to the air conduit.

8. The pneumatic impact disassembly tool of claim 7, wherein the connection rod comprises an assistance rod disposed in a perpendicular arrangement thereon.

9. The pneumatic impact disassembly tool of claim 8, wherein a handgrip is disposed between the switch and the intake part.

* * * * *